(12) United States Patent
Jackson

(10) Patent No.: US 11,511,609 B2
(45) Date of Patent: Nov. 29, 2022

(54) WIND-DEFLECTING ATTACHMENT FOR OPEN-AIR MOTOR VEHICLES

(71) Applicant: Robert Benjamin Jackson, Smyrna, TN (US)

(72) Inventor: Robert Benjamin Jackson, Smyrna, TN (US)

( * ) Notice: Subject to any disclaimer, the term of this patent is extended or adjusted under 35 U.S.C. 154(b) by 16 days.

(21) Appl. No.: 17/222,995

(22) Filed: Apr. 5, 2021

(65) Prior Publication Data

US 2021/0309085 A1  Oct. 7, 2021

Related U.S. Application Data

(60) Provisional application No. 63/004,872, filed on Apr. 3, 2020.

(51) Int. Cl.
*B60J 7/22* (2006.01)
*B60J 7/043* (2006.01)

(52) U.S. Cl.
CPC .................. *B60J 7/22* (2013.01); *B60J 7/223* (2013.01); *B60J 7/043* (2013.01)

(58) Field of Classification Search
CPC ..... B60J 7/22; B60J 7/223; B60J 7/047; B60J 7/0435; B62D 37/00; B62D 37/02
USPC ..... 296/217, 218, 219, 180.1, 85, 86, 180.3, 296/180.5, 181.4, 181.5
See application file for complete search history.

(56) References Cited

U.S. PATENT DOCUMENTS 7,641,275 B2 * 1/2010 Campbell .................. B60J 1/20
296/180.1

FOREIGN PATENT DOCUMENTS

| DE | 102006061832 A1 | * | 7/2008 | ............ B60J 7/1226 |
| DE | 202013007447 U1 | * | 11/2013 | ................ B60J 7/22 |
| JP | 2000085366 A | * | 3/2000 | ................ B60J 7/22 |

OTHER PUBLICATIONS

Matsunobu et al., "Wind Deflector for Sunroof in Automobile", Mar. 28, 2000, Publisher: Japanese Patent Office, Edition: JP2000085366A (Year: 2000).*
Inventor name not available, Assignee=Webasto, "draft deflector device on a vehicle roof opening", Nov. 7, 2013, Publisher: European Patent Office, Edition: DE202013007447U1 (Year: 2013).*
Dziubiel et al., "Folding top device for motor vehicle i.e. passenger car, has folding top ply transferable from position in which top ply represents part of vehicle roof, into another position in which top ply acts as luggage rack and/or as wind deflector", Jul. 3, 2008, Pub: EPO, DE102006061832A (Year: 2008).*

* cited by examiner

*Primary Examiner* — Dennis H Pedder
*Assistant Examiner* — Joyce Eileen Hill
(74) *Attorney, Agent, or Firm* — Mark A. Pitchford; Eric B. Fugett; Pitchford Fugett, PLLC

(57) ABSTRACT

A wind-deflecting baffle attachment has a planar main body, at least one baffle, and at least one mounting member. Each baffle is angularly connected to the main body, and the at least one baffle includes at least one central baffle centrally positioned on the main body. The at least one mounting member is connected to the main body and is configured to attach the main body atop an open-air vehicle frame in order to deflect incoming wind away from the occupants of the vehicle.

16 Claims, 4 Drawing Sheets

WIND-DEFLECTING ATTACHMENT FOR OPEN-AIR MOTOR VEHICLES

The current application claims a priority to the U.S. Provisional Patent application Ser. No. 63/004,872 filed on Apr. 4, 2020. The current application is filed on Apr. 5, 2021, whereas Apr. 4, 2021 was on a weekend.

FIELD OF THE INVENTION

The present invention relates generally to vehicle accessories. More particularly, the present invention relates to wind-diverting apparatuses for motor vehicles.

BACKGROUND OF THE INVENTION

A vehicle frame, also known as its chassis, is the main supporting structure of a motor vehicle to which all other components are attached, comparable to the skeleton of an organism. Most commonly, the spaces between the structural elements of the vehicle frame are occluded by solid doors, windows, and roof, forming an enclosed cabin capable of partially insulating its occupants from the surrounding environment, particularly from inclement precipitation, wind, debris, or other hazards.

Some vehicles, however, are designed with the capability of removing the roof, doors, and other barrier elements, leaving a skeletonized frame. Jeep vehicles in particular are popularly associated with this capability. This may lend itself well to various outdoor activities, such as leisure driving, transport to a recreation location, hunting, fishing, camping, off-roading, and the like.

However, even at medium driving speeds, wind forces can become quite strong and present an uncomfortable and undesirable environment to the occupants of the vehicle despite the presence of a windshield, which may not fully prevent wind from buffeting the tops of the vehicle occupants' heads or dipping further down into the occupant area.

It is therefore an objective of the present invention to provide a wind-deflecting attachment for open-air motor vehicles or configurations thereto that is easy to install and provides additional protection to the occupants of an open-air configured vehicle from being bothered by strong wind forces while driving.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

Figure 1:
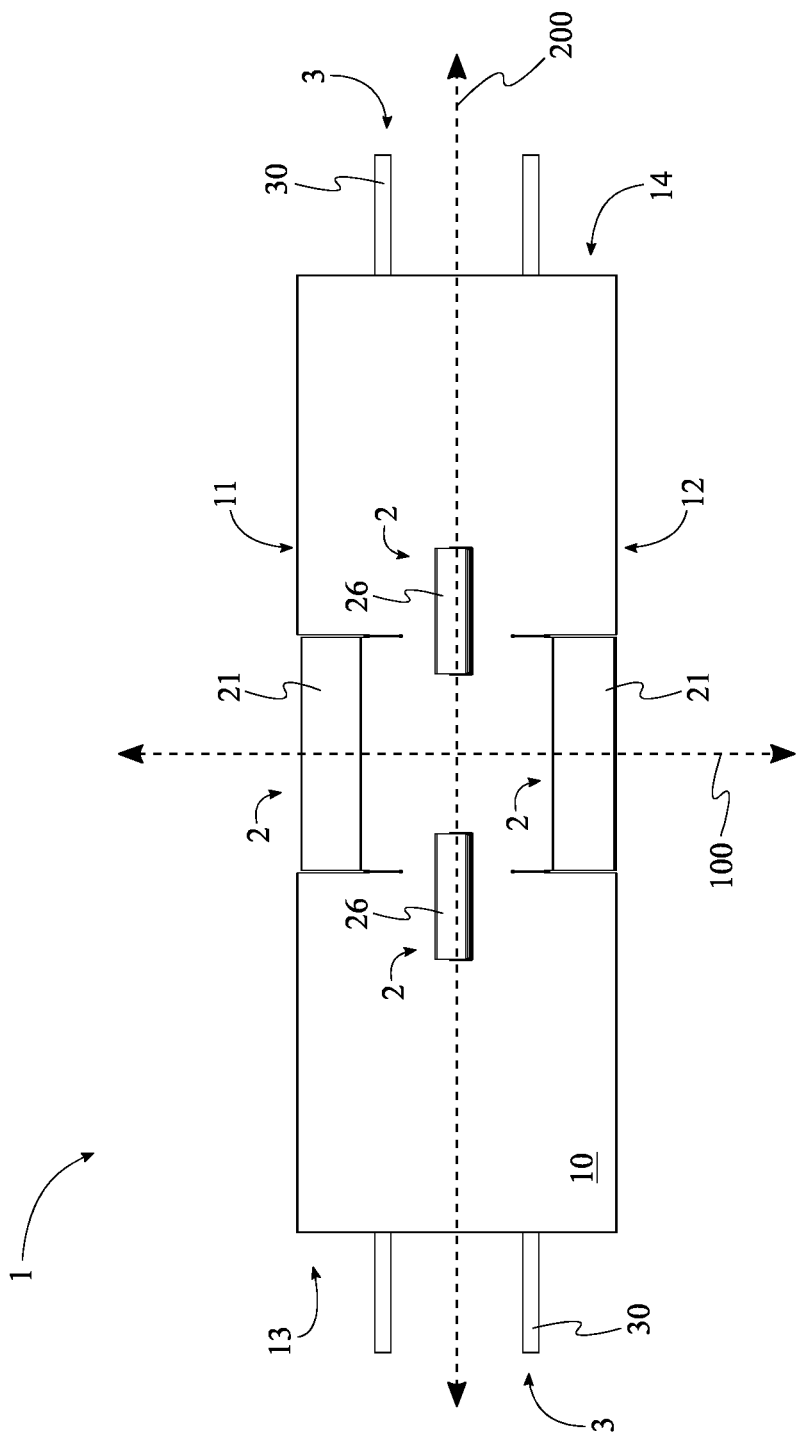
FIG. 1 is a top view of the present invention in accordance with one embodiment.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising", when used herein, specify the presence of stated features, steps, operations, elements, various embodiments, and/or components, but do not preclude the presence or addition of one or more other features, steps, operations, elements, various embodiments, components, and/or groups thereof.

Unless otherwise defined, all terms (including technical and scientific terms) used herein have the same meaning as commonly understood by one having ordinary skill in the art to which this invention belongs. It will be further understood that terms, such as those used in commonly used dictionaries, should be interpreted as having a meaning that is consistent with their meaning in the context of the relevant art and the present disclosure and will not be interpreted in an idealized or overly formal sense unless expressly so defined herein.

Wind-deflecting baffle attachments, apparatuses, fabrications, methods of manufacture and assembly and various qualities are discussed herein. In the following description, for purposes of explanation, numerous specific details are set forth in order to provide a thorough understanding of the present invention. It will be evident however, to one skilled in the art, that the present invention may be practiced with or without these details.

The present disclosure is to be considered as an exemplification of the invention, and it is not intended to limit the invention to the specific embodiments illustrated by the figures or descriptions.

The present invention is a wind-deflecting attachment for open-air motor vehicles. The present invention is primarily intended for use with an open-air motor vehicle such as, but not limited to, in various embodiments, Jeeps, Ford Broncos, or similar vehicles whose doors and top may be removed from the vehicle frame for open-air driving. The present invention is attached to the vehicle frame in a suitable location to deflect incident wind away from the driver and/or passengers of the vehicle, resulting in a more pleasant ride with less wind disturbance to the occupants of the vehicle.

The preferred embodiment of the present invention is primarily intended to be positioned atop the vehicle frame of an open-air motor vehicle, approximately longitudinally even with the row of vehicle seats to be protected from wind disturbance through the present invention.

Figure 2:
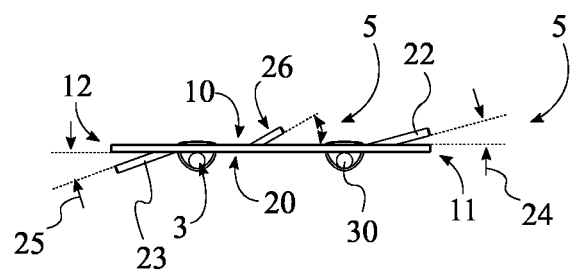
FIG. 2 is a side view of the present invention in accordance with one embodiment.

In general, referring to FIGS. 1-2, the present invention comprises a main body 1, at least one baffle 2, and at least one mounting member 3. The main body 1 may vary in different embodiments, but in the preferred embodiment, the main body 1 is a generally flat, elongate panel in shape, having planar geometry and in some embodiments, rectilinear perimetrical geometry. In various embodiments, the main body 1 may be constructed of any desired material, such as, but not limited to, steel, aluminum, wood, plastic, plexiglass, polycarbonate, rubber, or any other suitable material.

The main body 1 extends along a longitudinal direction 100, or forward-rearward direction, between a front end 11 and a rear end 12 of the main body 1. Further, the main body 1 extends along a lateral direction 200, or left-right direction between a first lateral end 13 and a second lateral end 14 of the main body 1. When installed onto the vehicle frame of an open-air motor vehicle, the front end 11 of the main body 1 is positioned longitudinally closer to the front wheels, while the rear end 12 of the main body 1 is closer to the back wheels. In general, the present invention is wider along the lateral direction 200 than deep along the longitudinal direction 100, as is typically the case with airfoils in order to expose a sufficient lateral cross-section to the incoming wind.

Each of the at least one baffle 2 is a plate-like structure designed to restrain or regulate the flow of a fluid; in the case of the present invention, each of the at least one baffle 2 functions in the present invention to regulate the flow of air around the main body 1, namely by deflecting the airflow away from the driver and/or passengers of an open-air motor vehicle the present invention is to be installed onto. The main body 1 and each of the at least one baffle 2 extend in thickness between a top side 10 and bottom side 20.

Each of the at least one baffle 2 is angularly connected to the main body 1, wherein each of the at least one baffle 2 is configured to deflect incident wind away from or toward a specified direction. The specific location, size, shape, and number of the at least one baffle 2 may a vary as desired in various embodiments.

The at least one mounting member 3 is connected to the main body 1 and configured to mount the main body 1 to an open-air motor vehicle. The specific nature of the at least one mounting member 3 is not considered to be of particular importance, and any suitable mounting means may be implemented in various embodiments of the present invention as suitable and desired. In some embodiments, the at least one mounting member 3 is connected to the bottom side 20 of the main body 1 and configured to secure the bottom side 20 of the main body 1 to the vehicle frame of an open-air motor vehicle.

For example, in some embodiments, the at least one mounting member 3 comprises a plurality of lateral supports 30. The plurality of lateral supports 30 may each be, for example, but not limited to, rods, sections of pipe, wooden boards or planks, manufactured plastic or metal support brackets, or any other type of preferably rigid material suitable to secure the main body 1 in a desirable location on the vehicle frame.

In various embodiments, the at least one baffle 2 may be formed through any suitable manufacturing process. In the preferred embodiment, the main body 1 and the at least one baffle 2 are formed from a single rectangular sheet of material. To this end, the main body 1 further comprises a plurality of cutouts 15, and each of the at least one baffle 2 is positioned into one of the plurality of cutouts 15. Each of the plurality of cutouts 15 is not a full removal of material, but rather a cut along three edges of what will end up as a baffle, leaving the fourth edge connected to the main body 1. The newly cut baffle is then bent to the desired angle relative to the main body 1, leaving a cutout, or empty space, which the material of the new baffle previously occupied. Thus, the shape of each of the at least one baffle 2 is delineated in some embodiments by the shape of out of the plurality of cutouts 15. It should be noted, however, that this specific manufacturing method is considered to be purely exemplary of some embodiments and non-limiting to the present invention, whereby any suitable means, method, or manufacturing process may be employed in various embodiments to manufacture the present invention.

In the preferred embodiment of the present invention, each of the at least one baffle 2 extends parallel to the lateral direction 200 along the main body 1. Alternatively stated, each of the at least one baffle 2 is oriented parallel to the lateral direction 200 and traverses laterally a certain distance along the main body 1. However, this is not a requirement; in some embodiments, one of more of the at least one baffle 2 may be oriented at an acute angle, for example, to the lateral direction 200.

Further, in some embodiments, it may be desirable to define more specifically the angle between the baffle and the main body 1, though in some embodiments it may alternatively be the case that the specific angle measurement may not be important so much so as that the angle does exist. To this end, a specified pitch angle 5 may be defined, "pitch" herein referring to forward or backward rotation about a pitch axis parallel to the lateral direction 200. In various embodiments, the specified pitch angle 5 may vary according to contextual need in order to suit a variety of situations, circumstances, or vehicle types, as the case may be. In some embodiments, the specified pitch angle 5 may be selected from a range between 15 degrees and 60 degrees. In other embodiments, the specified pitch angle 5 may be less than 15 degrees of greater than 60 degrees.

Figure 3:
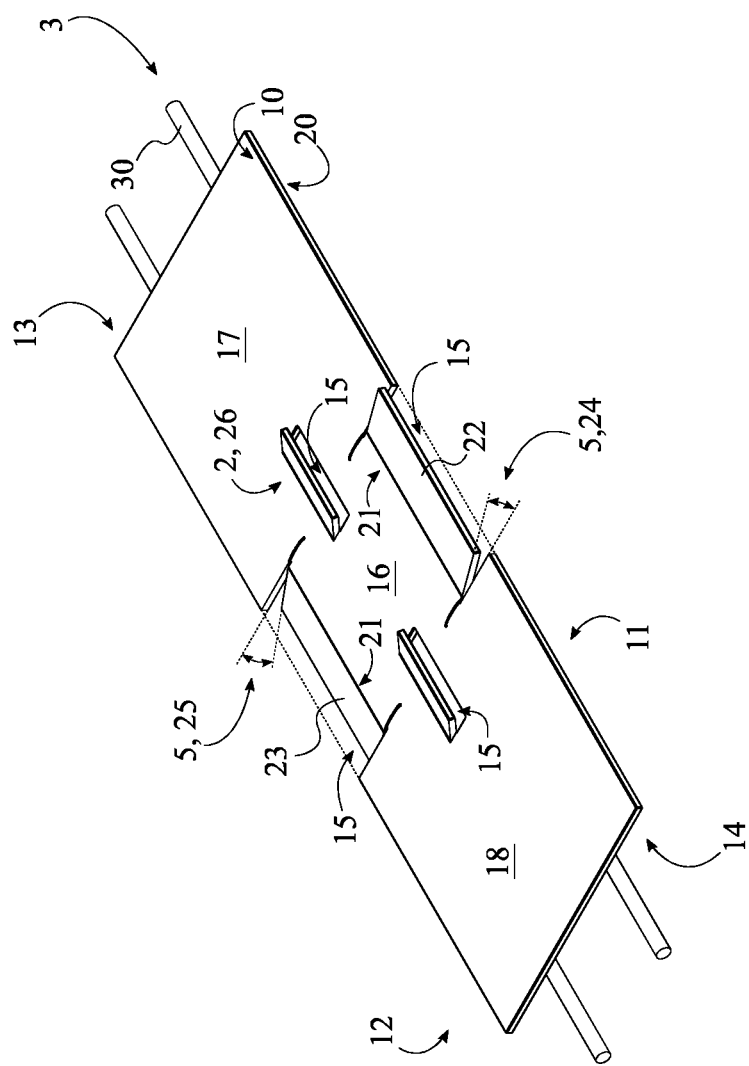
FIG. 3 is a raised front perspective view of the present invention in accordance with one embodiment.

Referring to FIG. 3, in the preferred embodiment, the main body 1 further comprises a central portion 16, a first lateral portion 17, and a second lateral portion 18. The first lateral portion 17 and the second lateral portion 18 are terminally connected adjacent to the central portion 16, laterally opposite each other along the central portion 16, wherein the first lateral portion 17 extends between the central portion 16 and the first lateral end 13, and wherein the second lateral portion 18 extends between the central portion 16 and the second lateral end 14. In some embodiments, the first lateral portion 17 and the second lateral portion 18 are delineated as a byproduct of the cutting and bending process of creating the baffles as previously described.

Further, in the preferred embodiment, the at least one central baffle 21 comprises a front central baffle 22 and a rear central baffle 23. The front central baffle 22 is angularly connected to the central portion 16 of the main body 1, adjacent to the front end 11. The rear central baffle 23 is also angularly connected to the central portion 16 of the main body 1, adjacent to the rear end 12, longitudinally opposite the front central baffle 22 along the central portion 16.

Moreover, in the preferred embodiment of the present invention, the specified pitch angle 5 of the front central baffle 22 is an upward acute angle 24, away from the top side 10 and the front end 11 of the main body 1. Further, the specified pitch angle 5 of the rear central baffle 23 is a downward acute angle 25, oriented away from the bottom side 20 and the rear end 12 of the main body 1. Thus, upon becoming incident with the present invention, wind is guided down the first slope of the front central baffle 22, across the flat central portion 16 of the main body 1, and then down the second slope of the rear central baffle 23.

Some embodiments of the present invention may further comprise at least one medial baffle 26. The at least one medial baffle 26 is preferably distributed across the main body 1 between the first lateral end 13 and the second lateral end 14, and between the front end 11 and the rear end 12. Moreover, each medial baffle is oriented at an upward acute angle 24, away from the top side 10 and the front end 11 of the main body 1. The at least one medial baffle 26 may vary as desired in different embodiments. In the preferred embodiment, the at least one medial baffle 26 comprises a first medial baffle and a second medial baffle. The first medial baffle and the second medial baffle are positioned longitudinally aligned with each other, and spaced apart from each other laterally and symmetrically on the main body 1 between the first lateral end 13 and the second lateral end 14.

As previously mentioned, in various embodiments the at least one mounting member 3 may take any suitable form. However, in some embodiments, the at least one mounting member 3 comprises a plurality of lateral supports 30. The plurality of lateral supports 30 is connected adjacent to and extends outwards from the main body 1. More particularly, the plurality of lateral supports 30 extends laterally outward from the first lateral end 13 and the second lateral end 14 of the main body 1, wherein the plurality of lateral supports 30 is configured to mount the main body 1 to an open-air vehicle frame.

Figure 4:
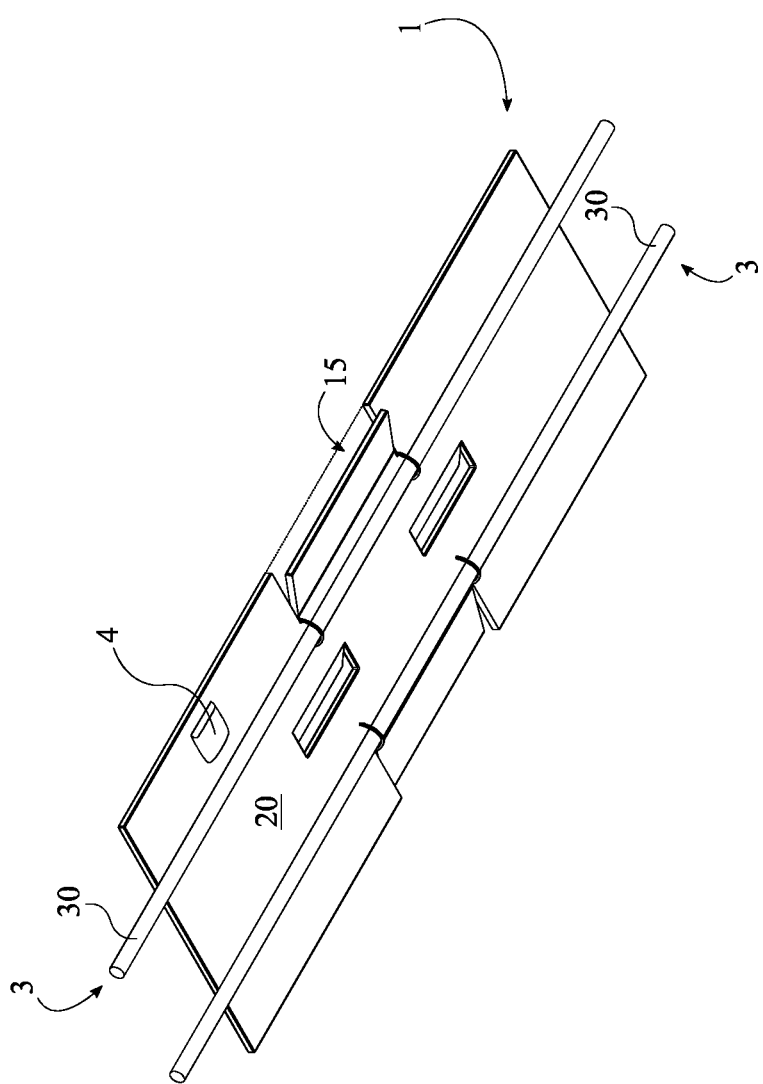
FIG. 4 is a lowered front perspective view of the present invention in accordance with one embodiment.

More particularly, in some embodiments the plurality of lateral support comprises a first pole and a second pole as shown in FIG. 4, which may be positioned approximately at longitudinal thirds along the main body 1, or in any other suitable location. It is noted that an open-air vehicle frame is assumed to have geometry approximately corresponding to a rectangular prism, having at the top of the vehicle frame a front laterally-oriented member and a pair of side longitudinally-oriented members surrounding empty space in the vehicle frame. The first pole and the second pole are secured to the bottom side 20 of the main body 1, and the opposing ends of both the first pole and the second pole are secured to the pair of side members of the vehicle frame through any suitable means, including, but not limited to, one or more straps, clasps, ratchets, clamps, fasteners, or other attachment means. In some embodiments, the first pole and the second pole are secured against the bottom side 20 of the main body 1 by a plurality of loop fasteners, such as, but not limited to, cable fasteners. The cable fasteners may utilize one of the cutouts 15 associated with one of the baffles as a first point of penetration through the main body 1, while a second point of penetration may be a simple through hole a short distance from said cutout.

Thus, the main body 1 is supported by the first pole and the second pole as the at least one mounting member 3, which are in turn secured to the side members of the vehicle frame. Alternatively, the main body 1 may be attached to any other location on the vehicle frame or doorframe using any suitable fastening means.

In various embodiments, the present invention may further comprise one or more of a number of miscellaneous convenience features. For example, in some embodiments, the present invention may further comprise at least one storage pocket 4, wherein the at least one storage pocket 4 is connected to the bottom side 20 of the main body 1. Further such features may include, but are not limited to, one or more mirrors, light sources, solar panels, audio speakers, or any other suitable features.

Although the invention has been explained in relation to its preferred embodiment, it is to be understood that many other possible modifications and variations can be made without departing from the spirit and scope of the invention as hereinafter claimed.

What is claimed is:

1. A wind-deflecting baffle attachment for open-air motor vehicles comprising:
   a main body extending along a longitudinal direction between a front end and a rear end of the main body, and along a lateral direction between a first lateral end and a second lateral end of the main body;
   at least one baffle being angularly connected to the main body, wherein the main body and the at least one baffle extend between a top side and a bottom side;
   at least one mounting member connected to the main body and configured to mount the main body to an open-air motor vehicle; and
   at least one central baffle separated from the at least one baffle, said at least one central baffle being positioned laterally central on the main body wherein:
   the at least one central baffle comprises a front central baffle and a rear central baffle;
   the front central baffle is angularly connected to a central portion of the main body adjacent to the front end; and
   the rear central baffle is angularly connected to the central portion adjacent to the rear end, longitudinally opposite the front central baffle along the central portion.

2. The wind-deflecting baffle attachment as claimed in claim 1, wherein the main body has planar geometry.

3. The wind-deflecting baffle attachment as claimed in claim 1, wherein the main body has rectilinear perimetrical geometry.

4. The wind-deflecting baffle attachment as claimed in claim 1 wherein:
   the at least one mounting member being connected to a bottom side of the main body and is configured to secure the bottom side of the main body to an open-air motor vehicle.

5. The wind-deflecting baffle attachment as claimed in claim 1 wherein:
   the main body further comprises a plurality of cutouts; and
   the at least one baffle is positioned in one of the plurality of cutouts.

6. The wind-deflecting baffle attachment as claimed in claim 5, wherein the shape of the at least one baffle is delineated by the shape of one of the plurality of cutouts.

7. The wind-deflecting baffle attachment as claimed in claim 1 wherein:
   the at least one baffle extends parallel to the lateral direction along the main body.

8. The wind-deflecting baffle attachment as claimed in claim 1 wherein:
   the at least one baffle is oriented at a specified pitch angle to the main body.

9. The wind-deflecting baffle attachment as claimed in claim 8 wherein:

the specified pitch angle is selected from a range between 15 degrees and 60 degrees.

10. The wind-deflecting baffle attachment as claimed in claim 1 wherein:
   the main body further comprises a central portion, a first lateral portion, and a second lateral portion; and
   the first lateral portion and the second lateral portion are terminally connected adjacent to the central portion, laterally opposite each other along the central portion, wherein the first lateral portion extends between the central portion and the first lateral end, and wherein the second lateral portion extends between the central portion and the second lateral end.

11. The wind-deflecting baffle attachment as claimed in claim 1 wherein:
   the specified pitch angle of the front central baffle being an upward acute angle, away from the top side and the front end of the main body; and
   the specified pitch angle of the rear central baffle being a downward acute angle, away from the bottom side and the rear end of the main body.

12. The wind-deflecting baffle attachment as claimed in claim 1 wherein:
   the at least one baffle comprises at least one medial baffle;
   the at least one medial baffle being distributed across the main body between the first lateral end and the second lateral end, and between the front end and the rear end; and
   each medial baffle being oriented at an upward acute angle, away from the top side and the front end of the main body.

13. The wind-deflecting baffle attachment as claimed in claim 1 wherein:
   the at least one mounting member comprises a plurality of lateral supports; and
   the plurality of lateral supports being connected adjacent to and extending outward from the main body.

14. The wind-deflecting baffle attachment as claimed in claim 13, wherein:
   the plurality of lateral supports extend laterally outward from the first lateral end and the second lateral end of the main body, and
   the plurality of lateral supports is configured to mount the main body to an open-air vehicle frame.

15. The wind-deflecting baffle attachment as claimed in claim 1 wherein:
   the wind-deflecting baffle attachment further comprises at least one storage pocket; and
   the at least one storage pocket is connected to a bottom side of the main body.

16. A wind-deflecting baffle attachment for open-air motor vehicles comprising:
   a main body extending along a longitudinal direction between a front end and a rear end of the main body, and along a lateral direction between a first lateral end and a second lateral end of the main body;
   at least one baffle being angularly connected to the main body, wherein the main body and the at least one baffle extend between a top side and a bottom side;
   at least one mounting member connected to the main body and configured to mount the main body to an open-air motor vehicle; and
   at least one central baffle separated from the at least one baffle, said at least one central baffle being positioned laterally central on the main body wherein:
   the at least one mounting member comprises a plurality of lateral supports;
   the plurality of lateral supports are connected adjacent to and extending outward from the main body; and
   the plurality of lateral supports extend laterally outward from the first lateral end and the second lateral end of the main body, wherein the plurality of lateral supports is configured to mount the main body to an open-air vehicle frame.

\* \* \* \* \*